(12) United States Patent
Jeong et al.

(10) Patent No.: US 12,134,399 B2
(45) Date of Patent: Nov. 5, 2024

(54) DRIVABLE SURFACE MAP FOR AUTONOMOUS VEHICLE NAVIGATION

(71) Applicant: Zoox, Inc., Foster City, CA (US)

(72) Inventors: Byungil Jeong, San Ramon, CA (US); Christopher James Gibson, Belmont, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/452,006

(22) Filed: Oct. 22, 2021

(65) Prior Publication Data

US 2023/0127185 A1 Apr. 27, 2023

(51) Int. Cl.
*B60W 60/00* (2020.01)
*G01C 21/00* (2006.01)

(52) U.S. Cl.
CPC ....... *B60W 60/001* (2020.02); *G01C 21/3819* (2020.08); *B60W 2552/05* (2020.02)

(58) Field of Classification Search
None
See application file for complete search history.

(56) References Cited

U.S. PATENT DOCUMENTS

| 6,622,085 B1 | 9/2003 | Amita et al. |
| 2005/0187705 A1 | 8/2005 | Niwa et al. |
| 2007/0226243 A1 | 9/2007 | Fuki et al. |
| 2009/0063042 A1 | 3/2009 | Santesson et al. |
| 2013/0117322 A1* | 5/2013 | Fischer ............... G06F 16/21 |
| | | 707/792 |
| 2013/0328924 A1 | 12/2013 | Arikan et al. |
| 2014/0136099 A1 | 5/2014 | Choi et al. |
| 2017/0169605 A1 | 6/2017 | Salomonsson et al. |

(Continued)

FOREIGN PATENT DOCUMENTS

| EP | 3247978 B1 | 3/2021 |
| JP | 2014503834 A | 2/2014 |
| WO | WO2022021910 | 2/2022 |

OTHER PUBLICATIONS

PCT Search Report and Written Opinion mailed Feb. 17, 2023 for PCT application No. PCT/US2022/046970, 12 pages.

(Continued)

*Primary Examiner* — Vivek D Koppikar
*Assistant Examiner* — David Ruben Pedersen
(74) *Attorney, Agent, or Firm* — Lee & Hayes, P.C.

(57) ABSTRACT

The present disclosure is related to generating map data explicitly indicating a total drivable surface, which may include multiple types of drivable surfaces. For instance, a given portion of a map may include map data indicating a combination of various drivable surfaces, such as road segments, lane properties, intersections, parking areas, shoulders, driveways, etc. Examples of the present disclosure join these different types of drivable surfaces into combined map data that explicitly indicates a total drivable surface, such as a perimeter boundary indicating or representing a transition from a drivable surface to a non-drivable surface. The map data indicating the total drivable surface may be searched to determine information related to a drivable surface boundary, such as location and type. This boundary information may be used in various contexts, such as when planning a trajectory or remotely controlling a vehicle.

20 Claims, 8 Drawing Sheets

(56) References Cited

U.S. PATENT DOCUMENTS

| | | | |
|---|---|---|---|
| 2017/0323028 A1* | 11/2017 | Jonker | G06F 16/9024 |
| 2018/0011888 A1* | 1/2018 | Rana | H04W 76/38 |
| 2019/0087508 A1* | 3/2019 | Karppanen | G06F 16/9577 |
| 2019/0212746 A1* | 7/2019 | Cheng | B60W 60/001 |
| 2019/0226858 A1 | 7/2019 | Freed | |
| 2020/0092693 A1 | 3/2020 | Zhang et al. | |
| 2020/0141738 A1 | 5/2020 | Dorum | |
| 2020/0219281 A1 | 7/2020 | Ogata et al. | |
| 2021/0009161 A1 | 1/2021 | Kim et al. | |
| 2022/0024485 A1* | 1/2022 | Theverapperuma | G06K 9/6257 |
| 2022/0319322 A1 | 10/2022 | Inoue et al. | |
| 2023/0126130 A1 | 4/2023 | Jeong | |
| 2023/0169861 A1 | 6/2023 | Baba et al. | |

OTHER PUBLICATIONS

Gao Z—English description of WO-2022021910-A1 via Espacenet Patent Translate, retrieved Sep. 8, 2023 (Year: 2023), 63 pages.
Office Action for U.S. Appl. No. 17/452,009, mailed on Sep. 19, 2023, Inventor #1 Byungil Jeong, "Drivable Surface Map for Autonomous Vehicle Navigation," 36 pages.

* cited by examiner

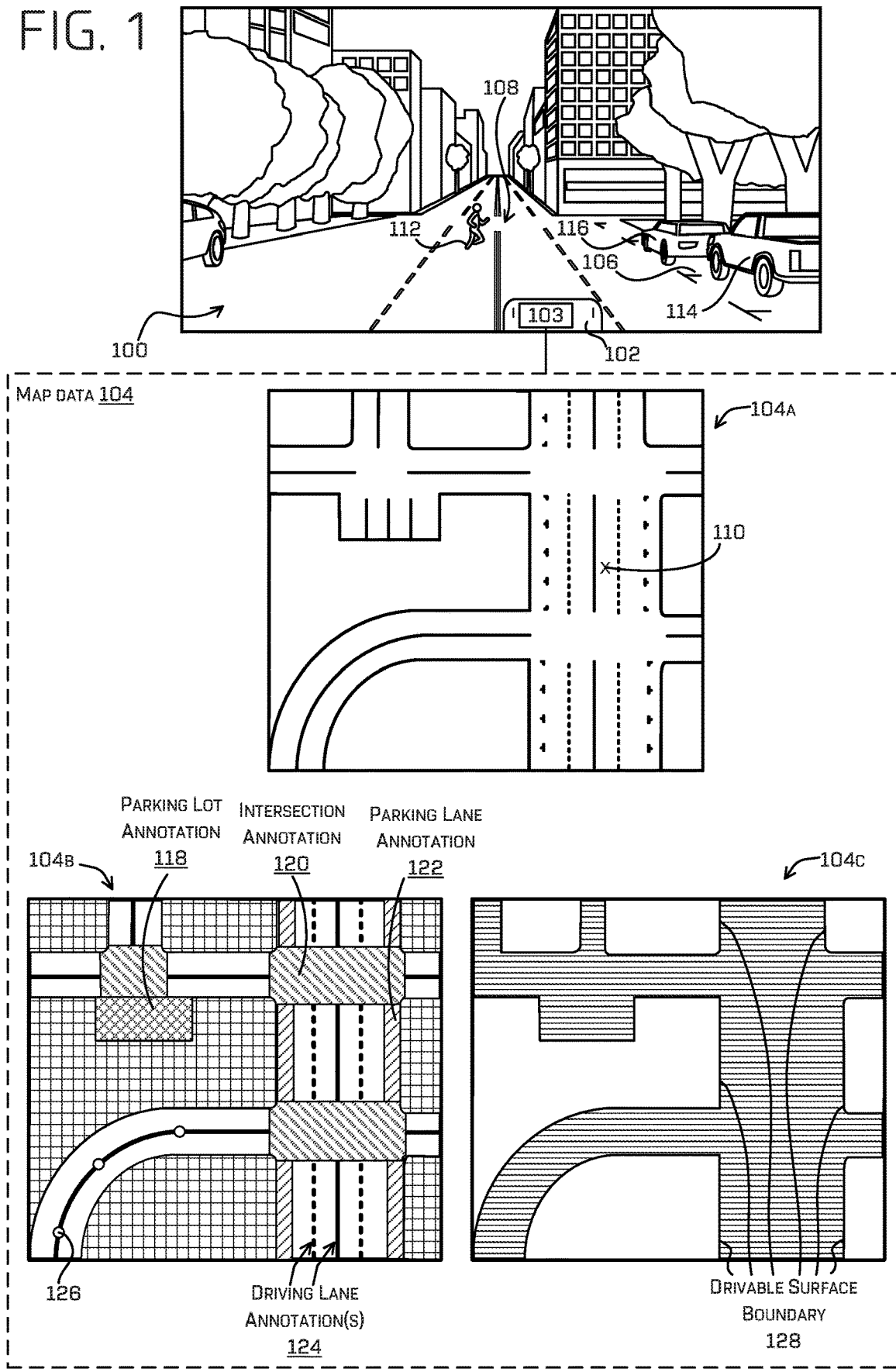

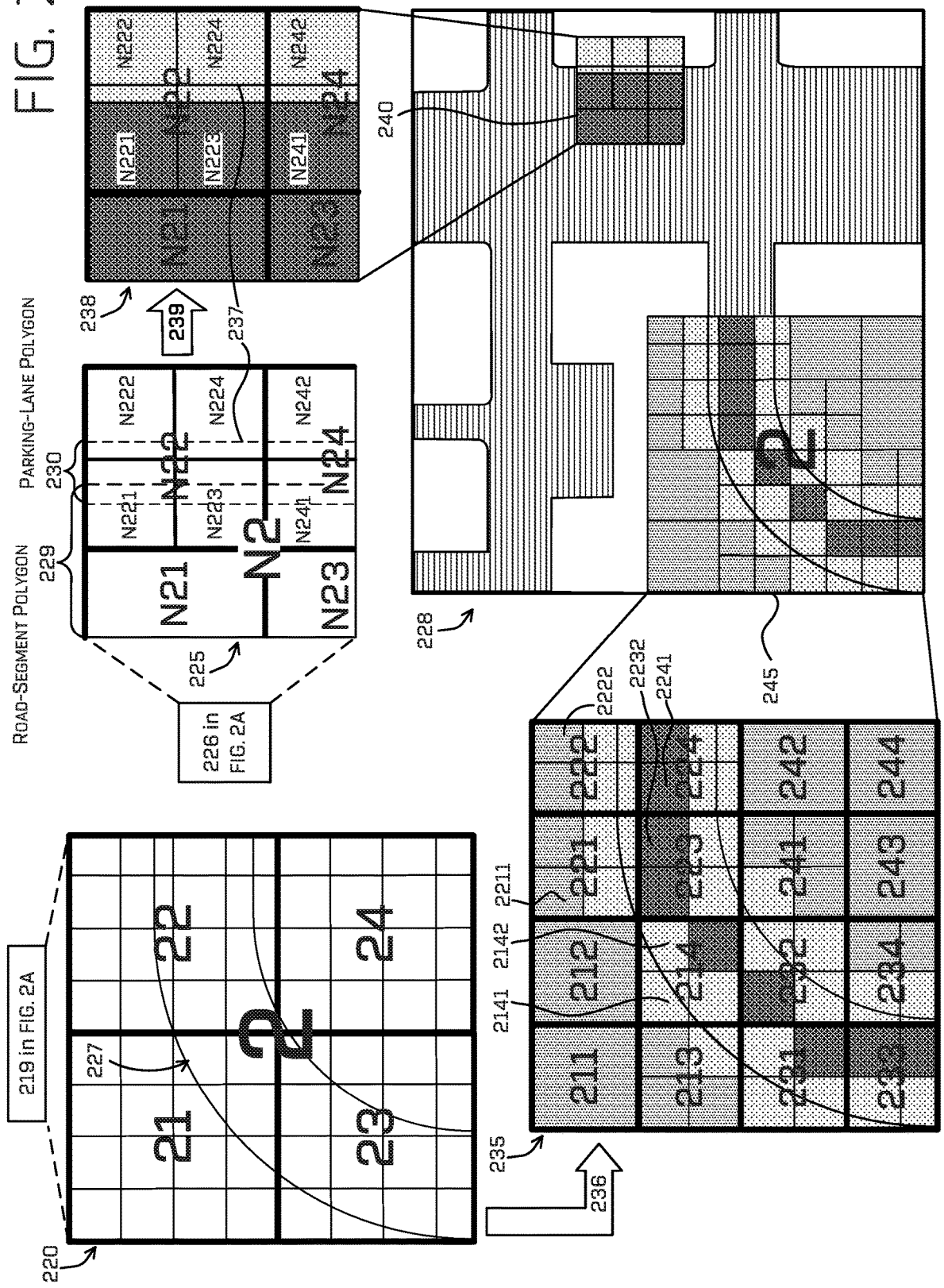

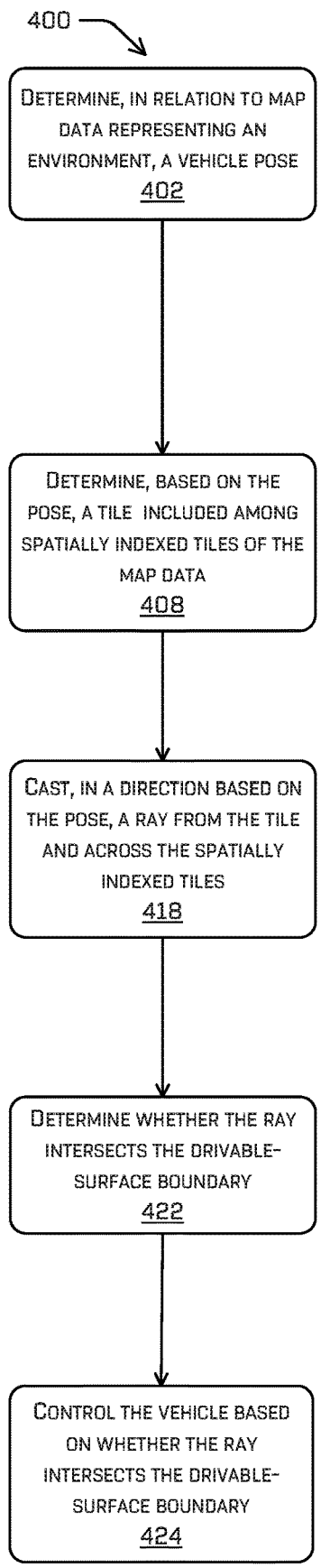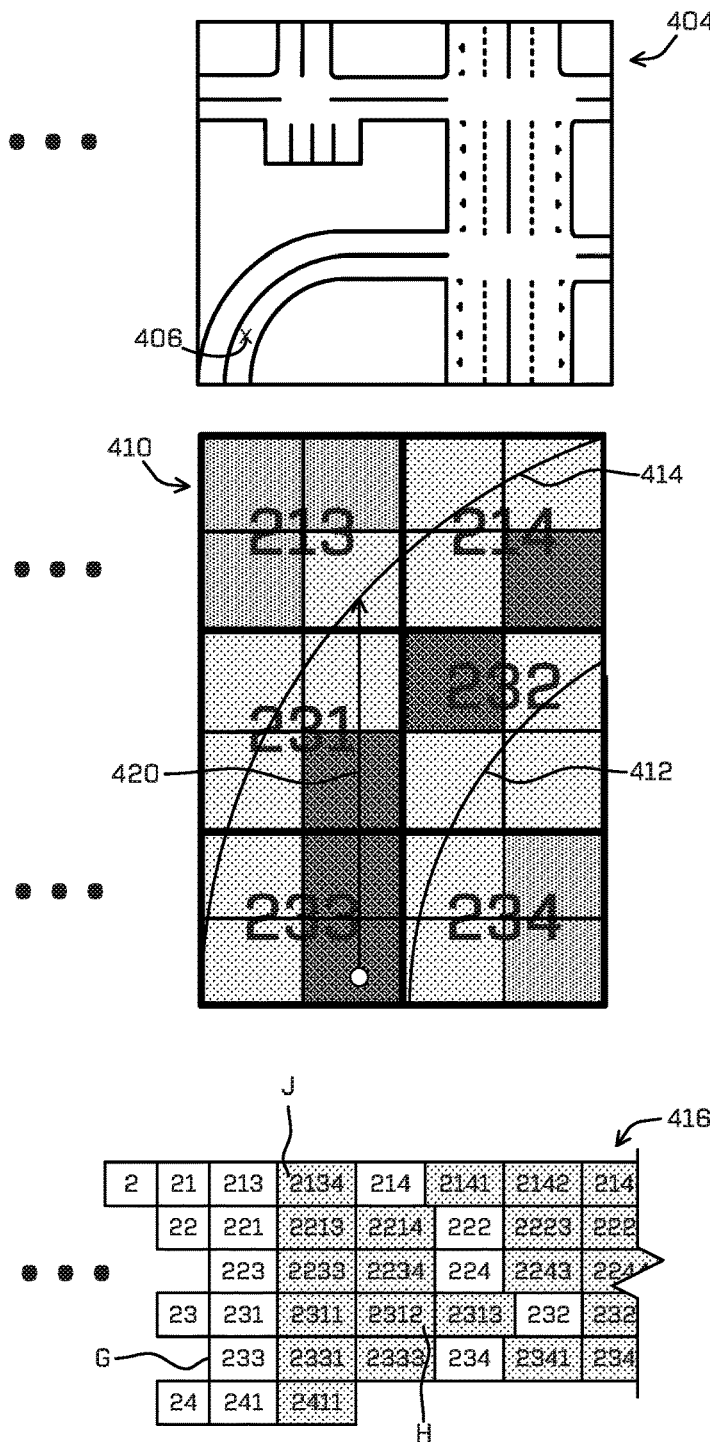
FIG. 4

DRIVABLE SURFACE MAP FOR AUTONOMOUS VEHICLE NAVIGATION

BACKGROUND

A map of an environment may include various types of information that is usable by a vehicle when performing different operations. For example, a map may include information indicating various types of drivable surfaces, non-drivable surfaces, lane markings, etc., and when planning motion through the environment, a vehicle may reference the map to determine a path, speed, etc. As such, accurate and robust map data can contribute to the vehicle executing maneuvers that efficiently and effectively use drivable surfaces.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 illustrates an example environment and example map data related to the environment, in accordance with examples of the present disclosure.

FIGS. 2A-2D illustrates example map data, which may be used to generate a searchable drivable-surface boundary, in accordance with examples of the present disclosure.

FIG. 4 illustrates an example process for searching map data, in accordance with examples of the present disclosure.

DETAILED DESCRIPTION

Figure 2A:
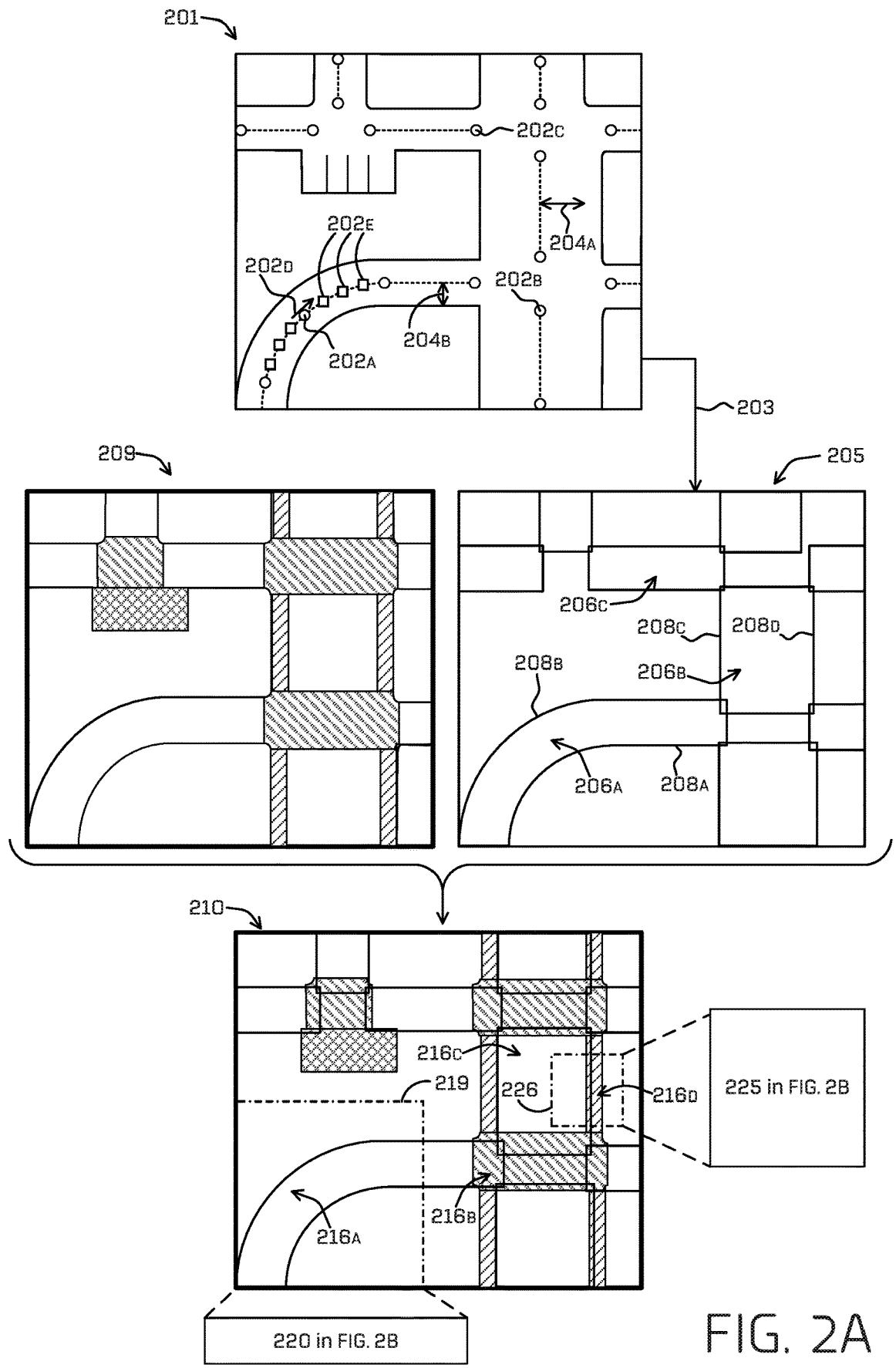

As described above, maps may be used by vehicles in various contexts, such as trajectory planning, teleguidance (e.g., navigating an environment via remote assistance), or other motion-planning operations. The present disclosure is related to generating map data explicitly indicating a total drivable surface, which may include multiple types of drivable surfaces. For instance, a given portion of a map may include map data indicating a combination of various drivable surfaces, such as road segments, driving lanes, intersections, parking areas, shoulders, driveways, etc. Examples of the present disclosure join these different types of drivable surfaces into combined map data that explicitly indicates a total drivable surface, such as a perimeter boundary indicating or representing a transition from a drivable surface to a non-drivable surface. In some examples, this map data explicitly indicating the total drivable surface may be generated (e.g., offline during a map-generating operation) and provided to an autonomous vehicle to be used when planning driving maneuvers. As such, the autonomous vehicle need not rely only on implicit representations of the total drivable surface (e.g., as may be derived from the map data separately representing different types of drivable surfaces) and/or may need not perform additional operations to determine total drivable surface areas. That is, without at least some examples of the present disclosure, a total drivable surface may only be implicitly represented by the various map data separately representing different sub-types of drivable surfaces, such that separately represented surfaces are independently processed; however, examples of the present disclosure join these different sub-types of drivable surfaces into combined map data indicating the total drivable surface. Such different types and sub-types of drivable areas may be usable by the vehicle to achieve different purposes. As a non-limiting example of such, a type indicative of a lane may be identified as the preferred location upon which to travel. However, in some instances (e.g., when making room for an emergency response vehicle to pass), it may be necessary to move the vehicle into other regions on which the vehicle is capable of driving (e.g., parking lanes, driveways, etc.) and, in those instances, various planning techniques described herein may broaden the space over which a solution is explored to include additional drivable surfaces.

Furthermore, in at least some examples, the map data indicating the total drivable surface may be generated and/or provided in a format conducive to efficient querying, such as when determining whether a given position (e.g., along a proposed trajectory) is within a drivable surface. For example, the map data may include spatially indexed tiles (e.g., quadtree structure) with subdivision into leaf tiles that may store various boundary data (e.g., boundary geometry, boundary type, etc.) Among other things, this may provide a finer granularity of classification along the drivable surface boundaries, and when loaded into memory, tiles representing adjacent portions in the environment may be linked to improve search efficiencies.

Having generally described some examples of the present disclosure, more specific examples are described below. In examples of the present disclosure, a vehicle (e.g., autonomous vehicle) includes a map component, which stores map data that is usable to navigate through an environment. For example, the map data may include information associated with the environment (e.g., indications of drivable or on-road surfaces, non-drivable or off-road portions, and lane markings), and using a pose of the vehicle, the vehicle may use the map data to generate a proposed trajectory (e.g., speed, steering angle, etc.) to navigate through the environment. In some examples, map data may include information separately identifying different types of drivable surfaces. For example, map data may include information separately identifying road segments, lanes, lane markings, parking areas (e.g., parking lanes, parking lots, parking spaces/spots, etc.), driveways, intersections, and the like.

In some conventional solutions, map data that separately identifies different types of drivable surfaces is provided to downstream components that consume the map data to determine or control operations of the vehicle (e.g., to determine a trajectory). In some instances, these downstream components process this map data to determine a boundary between drivable surfaces and non-drivable surfaces. For example, a boundary may be determined for any type of drivable surface (e.g., a first drivable-surface boundary for a road segment and a second drivable-surface boundary for a parking area). That is, some conventional solutions may include the downstream component (e.g., planner or planning component) performing additional operations (e.g., in real time) to process the separately identified drivable surfaces. Among other things, this may create processing inefficiencies and consume valuable computing resources, since multiple searches may be performed for different types of drivable surfaces. In addition, surfaces that are actually drivable in the environment may be misidentified as non-drivable surfaces (e.g., parking lanes that are actually drivable may be identified as non-drivable), based on the labeling nomenclature (e.g., annotations) included in the map data. In other instances, conventional solutions may artificially widen a driving lane to represent a full drivable surface, even if a human driver would not classify the particular strip of asphalt as part of the lane, which can result in incomplete or less rich map data that may be less accurate. In addition, conventional solutions may apply costs to different lane types, without considering the drivable surface as a whole, which may unnecessarily bias trajectories to certain lane types in circumstances in which queries from the vehicle are searching for any drivable surface.

In contrast to some conventional solutions, at least some examples of the present disclosure include, prior to consumption by a downstream client (e.g., planner, remote operations, etc.) combining separately identified drivable surfaces into map data identifying a total drivable surface. For example, the total drivable surface may be identified offline, during a map data generating process, and before the map data is provided to the vehicle. A total drivable surface may be determined in various manners. In at least some examples, techniques of the present disclosure include demarcating road segments, which may be identified in map data, with polygons (e.g., simple polygons or other constructs). For example, an adaptive curve sampling technique may be applied to generate simple polygons representing road segments. That is, in some examples, a road segment may be represented in map data as a collection of control points with tangent constraints and lane widths. As such, a collection of Piecewise Clothoid Curves (PCC) may be fit to the control points, and the curves may be iteratively subdivided until they meet a curve constraint (e.g., user defined length, radian, etc.). From the sub-divided curves, outermost lane boundaries may be determined based on the lane widths, which may provide opposing sides of the polygons. Of course, other representations of such curves are contemplated such as, but not limited to, Bezier curves, polynomial expansions, etc.

In addition to polygons representing road segments, polygons (e.g., annotating polygons) or other area annotations may represent other drivable surfaces. That is, map data may include annotating polygons (or other constructs) representing surfaces, other than road segments, that are drivable. For example, annotating polygons may represent parking lanes, parking lots, parking spaces/spots, driveways, shoulders, intersections, and the like. In one or more examples of the present disclosure, the polygons representing road segments are joined together with polygons representing other, separately identified, drivable surfaces to provide a total drivable surface. That is, polygons representing the various drivable surfaces typically have at least some overlap (e.g., where a road segment transitions to a parking lot), and at least some examples of the present disclosure are directed to joining the polygons into a combined (e.g., larger) polygon that represents the total drivable surface.

Polygons may be joined using various techniques, and in at least some examples, the polygons (and the total drivable surface) may be represented by spatially indexed tiles (e.g., tree data structure such as quadtree, k-d tree, or other n-tree data structure). For example, a tile structure may be applied to a map having polygons representing the various driving surfaces, and higher-level tiles that are either completely within a drivable surface or completely outside the drivable surface may be represented more generally and/or without further subdivision. Further, in some examples, tiles that are along the boundary line(s) of the drivable surface may be sub-divided into lower-level tiles (e.g., leaf tiles) with additional boundary data (e.g., geometry of the boundary line). In addition, data associated with the higher-level tiles and the leaf tiles may store various information, such as a classification (e.g., drivable, boundary, non-drivable, etc.), boundary type (e.g., curb, wall, grass, sand, dirt, gravel, etc.), boundary geometry, and the like. In at least some examples, the data structure may be maintained as a component (e.g., first-class citizen) of the map data and may support efficient querying. For example, a query may include determining whether a given pose of the vehicle falls within a drivable area, boundary, or non-drivable area. In another example, a query may include, based on ray casting, determining whether and/or where a trajectory from a given pose will intersect a boundary of the total drivable surface and determining a distance from a pose to a boundary.

In at least some examples, information may be stored in association with a tile (e.g., in-memory) that provides additional searching advantages. For example, boundary type information may be stored in association with a tile, and as such, a query may determine a type of boundary that is intersected by a given query (e.g., a type of boundary of the drivable surface). Moreover, examples of the present disclosure may link tiles that are organized under different parent tiles in the spatially indexed structure. That is, two tiles that store data associated with adjacent portions of a map may be organized under different branches (e.g., parents) of the spatial index. However, when performing a query, it may be useful to progress directly from one tile into another tile, even when the tiles are organized under different parent tiles. As such, examples of the present disclosure include storing links between tiles that are organized under different parent tiles and that are associated with adjacent portions of a map or environment. As such, when executing a query to determine whether and/or when a trajectory will intersect a boundary, the link may be used to move from one tile to the next tile, which may be more efficient than traversing up through the hierarchical structure.

The techniques described herein can be implemented in a number of ways. Example implementations are provided below with reference to the following figures. Example implementations are discussed in the context of autonomous vehicles; however, the methods, apparatuses, and components described herein can be applied to a variety of components (e.g., a robotic platform), and are not limited to autonomous vehicles. In one example, the techniques described herein may be used in driver-controlled vehicles. In another example, the techniques can be used in an aviation or nautical context. Furthermore, the techniques described herein can be used with real data (e.g., captured using sensor(s)), simulated data (e.g., generated by a simulator), or any combination of the two. Additionally, the subject matter of this disclosure may provide various advantages or benefits. For instance, in some cases, the techniques described may provide safer vehicle operation, such as by improving the accuracy of map data relied on to determine trajectories and increasing the speed and efficiency with which trajectory determinations are calculated.

FIG. 1 illustrates an environment 100 in which a vehicle 102 may be positioned. In addition, FIG. 1 illustrates map data 104a, 104b, and 104c (e.g., collectively map data 104) that may represent at least some aspects of the environment and that may be used by the vehicle 102 to navigate through the environment 100. For example, the environment 100 may include a parking lane 106 and an intersection 108, and at least some of the map data 104 may also include information associated with the parking lane (e.g., parking lane annotation 122) and the intersection (e.g., intersection annotation 120).

The vehicle 102 may include various components that enable the vehicle 102 to navigate through the environment 100 using the map data 104. In some examples, the vehicle 102 may include at least some of the elements described with respect to the vehicle 502 in FIG. 5. For example, the vehicle 102 may include one or more computing devices 103 that store the map data 104 and that reference the map data 104 to determine trajectories for maneuvering through the environment 100. That is, at least some portions of the map data 104 may include static elements that were recorded in the map data 104 during a map-creation process, such as road segments, lanes, parking areas, driveways, sidewalks, intersections, non-drivable areas, etc. In addition, the vehicle 102 may include components for determining a position in the environment 100 and relative to the map data 104, such as the position 110 marked in the map data 104a. For example, the vehicle 102 may include position sensors for determining a local, relative, or global position, such as location sensors (e.g., global positioning component (GPS), compass, etc.) and inertial sensors (e.g., inertial measurement units, accelerometers, magnetometers, gyroscopes, etc.). Furthermore, the vehicle 102 may include a perception system for determining elements that may not be in the static map data but that is in the environment 100 in which the vehicle 102 is navigating, such as the pedestrian 112 and the other vehicles 114 and 116. Moreover, the vehicle may include a planning component that, based on the map data 104, the vehicle position (e.g., 110), and the other elements sensed in the environment 100, may determine one or more trajectories for navigating through the environment.

As described above, the usability and accuracy of the map data 104 may be important for safe navigation of the vehicle 102 through the environment 100. In some examples, the map data 104 may include different data entities used by various components of the vehicle for various driving operations. As such, the map data 104 may include various types of information. For instance, the map data 104 may include information indicating driving lanes, solid lane lines, dash lane lines, drivable surfaces (e.g., "on-road" surfaces), non-drivable surfaces (e.g., "off-road" surfaces), and the like. In some examples, the map data 104b may include annotations associated with different types of drivable surfaces. For example, the map data 104b may include a parking lot annotation 118, an intersection annotation 120 a parking lane annotation 122, driving lane annotations 124, and the like. In some examples, these annotations that represent various drivable surfaces may be represented with annotating polygons or other constructs (e.g., simple polygon shapes representing a location or area in the environment 100). In at least some examples, map data 104 may also include annotating polygons representing non-drivable portions, such as medians, that are entirely within a larger drivable-surface annotating polygon or that overlap with a drivable-surface annotating polygon.

In addition, the map data 104 may include other data that represents road segments, such as control points (e.g., 126) with tangent constraints and lane widths. In some examples, control points may be generated or applied to a map during a mapping process, such as when a cartographer (or cartographer process) is creating map data to represent an environment. For example, to represent a road curvature, control points 126 may be applied to a road. In examples, the spacing, location, and number of control points may be based on an optimized arrangement of control points that, with given control-point constraints (e.g., embedded curve tangents) most accurately represents the road. Although the road segment data is illustrated combined with other annotations in map data 104b, in some examples, the road segment data may be stored and maintained separately.

In examples of the present disclosure, map data including the various annotations, labels, control points, and the like, may be generated by a human cartographer and/or automated. For example, in some instances, a human cartographer may provide initial map data (e.g., control points representing a road), and an alignment of the control points may be automatedly adjusted by smoothing or providing other adjustments. In another example, based on sensor data, map data may be automatedly generated, and a human cartographer may verify and/or adjust the automatedly generated map data.

Absent examples described in this disclosure, some conventional solutions may provide map data to downstream components (e.g., planning component) without defining a total drivable surface. For example, some conventional solutions may provide map data with at least some of the independently defined drivable surfaces (e.g., parking areas, intersections, road segments, driveways, etc.), but the total drivable surface comprised of these various drivable surfaces is only implicitly determinable. With these more conventional solutions, the downstream component may execute additional operations to combine the independently defined drivable surfaces, which can be less efficient and can consume valuable computing resources, and/or may run separate queries to any one or more of the different types of drivable surfaces to determine location (e.g., relative to the vehicle), which can also be less efficient. In contrast to conventional solutions, examples of the present disclosure provide a total drivable surface, as represented by the map data 104c. That is, at least some examples of the present disclosure may combine the independently defined drivable surfaces into a larger, combined total drivable surface, including a drivable surface boundary 128 indicating a transition from a drivable surface (e.g., any drivable surface) to a non-drivable surface. For instance, a total drivable surface may be determined during operations directed to mapping the environment 100, such that the total drivable surface is available to be consumed (e.g., as a first-class citizen of the map data) by downstream components.

Figure 2C:
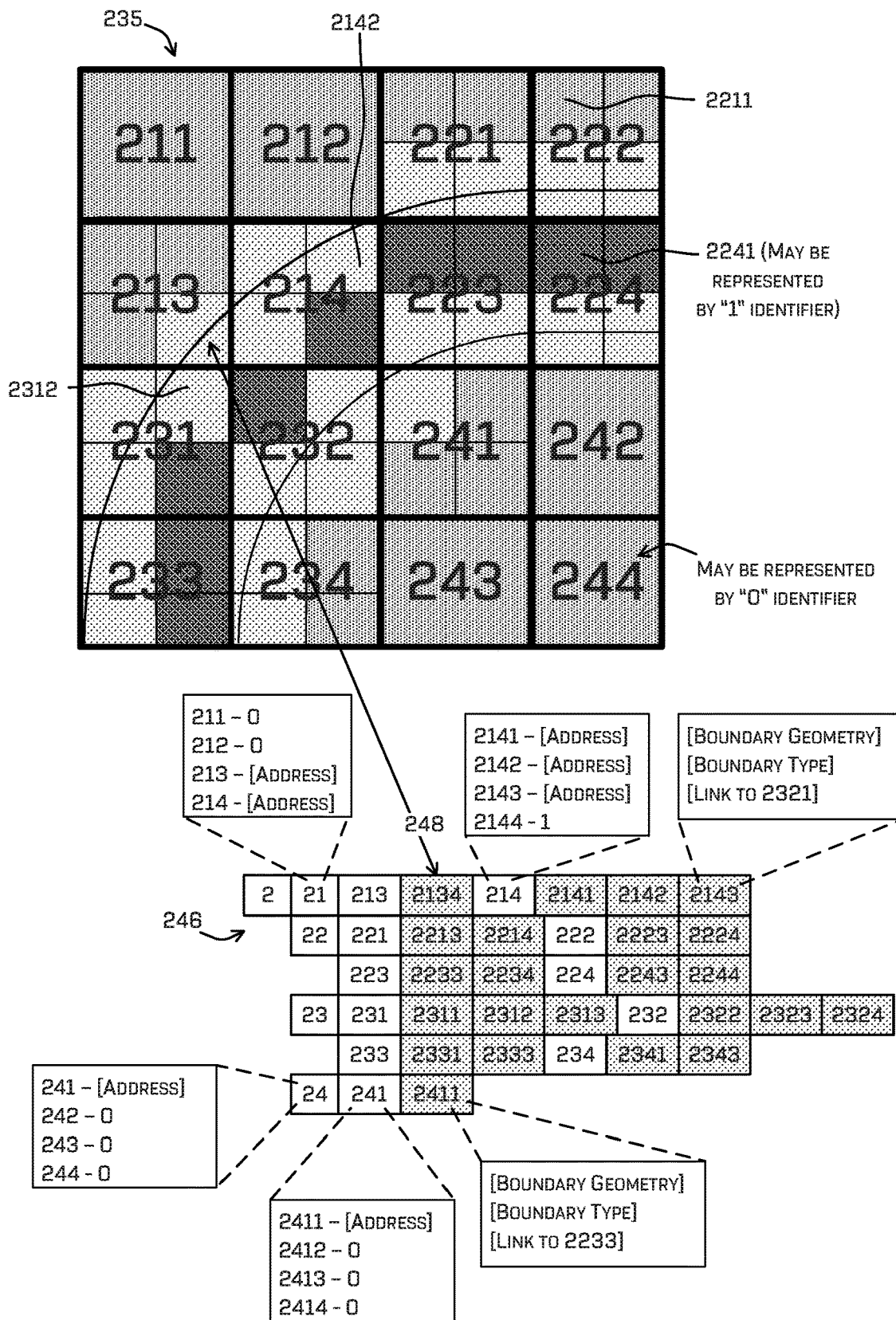

Referring now to FIGS. 2A, 2B, and 2C, some operations for determining a total drivable surface (e.g., 128 in FIGS. 1 and 228 in FIG. 2B) are described according to at least some examples. As indicated, in one or more examples of the present disclosure, the polygons representing road segments are joined together with annotating polygons representing other, separately identified, drivable surfaces to provide a total drivable surface. In addition, pursuant to at least some examples, map data including the joined polygons may be divided into hierarchical spatial tiles (e.g., the portions 240 and 245 in FIG. 2B illustrating tiles), which may be converted to serialized map data (e.g., data in 246 in FIG. 2C), as explained in more detail below.

In at least some examples of the present disclosure, map data 201 (FIG. 2A) indicating road segments may include various information. For example, map data 201 indicating road segments may include control points (e.g., 202a, 202b, and 202c), tangent constraints (e.g., represented by the arrow 202d), and lane widths (e.g., 204a and 204b). In some examples, map data 201 may be used to generate 203 polygons (e.g., 206a, 206b, and 206c) representing road segments, as depicted by map data 205. That is, road-segment polygons may be generated in a post process, after map editing is completed (e.g., after the map data has been labeled to include various information, including the control points). For example, an adaptive curve sampling technique may be applied to the control points to generate simple polygons representing road segments. That is, a collection of Piecewise Clothoid Curves (PCC) may be fit to the control points (e.g., 202a-202c), and the curves may be iteratively sub-divided (e.g., see curve samples 202e) until they meet a curve constraint (e.g., user defined max length, max radian length, etc.). In some examples, the curves may be used to determine a longitudinal dimension of polygons. In addition, from the sub-divided curves, outermost lane boundaries (e.g., 208a, 208b, 208c, and 208d) may be determined based on the lane widths, which may provide opposing sides of the polygons. In examples, lateral dimensions may be based on the lane width(s). In addition, in some examples, the polygons may be longitudinally extended to ensure overlap with adjacent road segments.

In at least some examples, road-segment polygons (e.g., those in map data 205) and other drivable surface annotating polygons (e.g., those in map data 209, which may be extracted from the map data 104b in FIG. 1) are combined or otherwise included together (e.g., via the post-processing map editing tool), possibly in an overlapping fashion (e.g., geometrically or mathematically), such as depicted by the map data 210. In addition, the polygons representing road segments are joined together (e.g., by a union operation) with annotating polygons representing other, separately identified, drivable surfaces to provide a total drivable surface (e.g., 128 and/or 228). For example, the road-segment polygon 216a (e.g., may correspond with polygon 206a) is depicted as overlapping the intersection polygon 216b, and the road-segment polygon 216c is depicted as overlapping the parking lane polygon 216d. In addition, road-segment polygons may be joined with other road-segment polygons (e.g., end-to-end road-segment polygons that have been longitudinally extended as described above). In examples of the present disclosure, these polygons may be joined to form a total drivable surface (e.g., 128 and/or 228). It should be understood that the map data 210 is provided as an illustration of overlapping polygons, and map data may or may not be rendered in the form depicted by map data 210. For example, as a result of polygon merging operations, which may be automated or computationally performed, at least some of the overlapping depicted in map data 210 may be skipped as a result of merging/clipping operations (described below).

In examples of the present disclosure, when generating a total drivable surface, the drivable surface polygons (e.g., 216a, 216b, 216c, and 216d) are divided into hierarchical spatial tiles (e.g., n-tree structure such as quadtree, k-d tree, etc.), which can be serialized and indexed. In general, during the conversion, a tile structure may be applied to map data having polygons representing the various driving surfaces. For example, the map data 210 includes a first portion 219 and a second portion 226, which are depicted in FIG. 2B with a tile structure. More specifically, in FIG. 2B, the map data 220 illustrates an enlarged view of the portion 219 (from FIG. 2A) with a tile structure, and the map data 225 illustrates an enlarged view of the portion 226 (from FIG. 2A) with a tile structure. In addition, the map data 220 and the map data 225 depict respective drivable surface polygons, and examples of this disclosure are related to accurately and efficiently storing data (e.g., serialized map data or other in-memory searchable data) describing the drivable surfaces divided by the hierarchical spatial tiles. For example, the map data 220 includes a polygon 227, which represents a portion of the polygon 216a (in FIG. 2A), and the map data 225 includes polygon portions 229 and 230 of the road-segment polygon 216c and the parking-lane polygon 216d (respectively). As described below, examples of this disclosure are related to storing data related to the polygons 227, 229, and 230 (e.g., serialized map data or other in-memory searchable data) in the spatially indexed data structure.

Conversion to a spatially indexed data structure may be accomplished in various manners. In general, map portions representing portions of the environment are associated with grid cells or tiles, which may be iteratively divisible into a quantity of sub-tiles. For example, in a quadtree data structure, nodes/tiles may be iteratively divisible into four sub-nodes until a threshold is met or a level of granularity is achieved (e.g., representing or corresponding to a two-meter x two-meter portion). In the map data 220, a hierarchical data structure is illustrated in which a node "2" (e.g., first-level tile) has been divided into four sub-tiles (e.g., second-level tiles), including nodes "21," "22," "23," and "24." In addition, as depicted by the map data 235, which may be a lower level abstraction 236 of the map data 220, any of the four second-level nodes may be further divided into four, third-level tiles (e.g., 211-214; 221-224; 231-234; and 241-244). The map data 225 is also illustrated with a spatial data structure, in which a node "N2" (e.g., second level tile where "N" could be any integer) has been divided into sub-tiles (e.g., N21, N22, N23, and N24), at least some of which may be further divided into lower-level sub-tiles.

In some instances, conversion to the spatially indexed data structure for storing a total drivable surface boundary may include various operations. For example, sometimes two or more polygons may overlap, and as such, examples of the present disclosure may clip out boundaries that are entirely within a drivable tile when the polygons are stored in the hierarchical data structure. That is, in some instances, sides of polygons may overlap with one another, and examples of the disclosure may remove the overlapping sides (e.g., which may represent the boundaries of the drivable surface represented by the polygon). For instance, the representation 225 depicts the road-segment polygon portion 229 (e.g., a portion and/or side of the road-segment polygon 216c in FIG. 2A) overlapping with the parking-lane polygon portion 230 (e.g., a portion and/or side of the parking lane polygon 216d in FIG. 2A).

In at least some examples, merging of polygons (or clipping of polygon portions) may be automatically performed based on a set or series of geometric logical checks. For example, a geometric logical check may automatically determine whether a smaller drivable surface polygon is entirely within one or more other larger drivable surface polygons, and if so (e.g., proven geometrically), clip that smaller drivable surface polygon. Another example geometric logical check may geometrically determine whether overlapping polygon portions contribute to the periphery outline, and if not, then automatically remove those portions. In some examples, the present disclosure may perform Boolean operations on the polygons to determine portions of polygons contributing to the drivable surface boundary. For instance, the Boolean operations may consider the type of annotation polygon being processed, including whether the polygon represents a drivable surface, the type of drivable surface, or alternatively, whether the polygon represents a non-drivable surface, such as a median, and should be excluded from the drivable surface. As such, examples of the present disclosure enable creation of one larger, drivable surface polygon, from which smaller, non-drivable surface polygons may be excluded, as opposed to needing to create multiple drivable surface polygons around the non-drivable area. Examples of the disclosure may determine (e.g., when performing Boolean operations) whether a polygon represents a drivable surface (or an exclusion from a drivable surface) based on vertex order of the polygon. For instance, in one example, drivable surface polygons may include a clockwise vertex order and non-drivable surface polygons may include a counterclockwise vertex order. In at least some such examples, removal may be based at least in part on a hierarchy of drivable types. For example, where a polygon of type lane overlaps with a polygon of type sidewalk, the overlapping portion that is indicated as a lane may be removed, while the polygon portion indicated as type sidewalk may be retained. Stated differently, in some examples, where a drivable surface polygon of one type (e.g., shoulder) overlaps with a non-drivable surface polygon of another type (e.g., sidewalk), then the Boolean operations may include excluding the non-drivable surface polygon from the drivable surface polygon, such that the overlapping portion of the drivable surface polygon is excised. In such examples, such a hierarchy may improve the safe operation of the vehicle by further biasing the vehicle away from certain drivable types (e.g., away from the sidewalk in this example).

In accordance with an example of the present disclosure, the polygons are unioned in leaf tiles. That is, a tile may be classified based on whether the tile is either completely within a drivable surface boundary, inclusive of a drivable surface boundary (e.g., a boundary segment extends through the tile), or entirely outside of a drivable surface boundary. For example, tiles N21 and N23 are completely within an outer drivable surface boundary 237 of the parking-lane polygon 230, such that these tiles may be classified as a drivable-type tile. In addition, since the entire N21 node and N23 node are classified as a drivable-type tile, the conversion need not further divide/partition the N21 node and the N23 node into sub-tiles (e.g., need not further divide into leaf tiles). In another example, nodes N22 and N24 both include the outer boundary 237 and may be classified as a boundary-type tile. As such, any of the nodes N22 and N24 may be divided/partitioned into leaf-tiles (e.g., N221, N222, N223, N224, N241, and N242), and any of the leaf tiles may be further classified. For example, leaf tiles N221, N223, and N241 may be classified as a drivable-type tile (e.g., entirely within the drivable surface), and leaf tiles N222, N224, and N242 may be classified as boundary-type tiles (e.g., inclusive of a portion of the boundary 237). As described above, tile classification may be automatically determined based on geometrical queries.

In accordance with at least some examples, boundaries (e.g., polygon sides) located in the drivable-type tiles (e.g., N21, N221, N223, N23, and N241) are removed (e.g., clipped) from the total drivable surface boundary data, and as such, these clipped boundaries may be removed from further subsequent polygon-union operations. For example, the map data 238 represents a version of the map data 225 after processing 239, in which boundaries have been clipped and various nodes or tiles have been classified. That is, in the map data 238 the boundary 237 (other side of the polygon 230) is still represented, but the other boundaries associated with the polygons 229 and 230 are removed. As explained above, removal of polygon portions may be automatically performed based on geometric logical checks and/or other rules. Among other things, clipping these boundaries may significantly reduce work associated with combining polygons, may reduce an amount of data stored, and may improve searching efficiencies. Furthermore, in the map data 238, the tiles N21, N23, N221, N223, and N241 have been classified as drivable (e.g., as represented by the darker stipple), and the tiles N222, N224, and N242 have been classified as boundary (e.g., as represented by the lighter stipple). In some examples, the remaining, non-clipped boundary information is further processed as part of the conversion. For example, additional polygon union (e.g., of the outermost drivable surface boundaries), may then be performed with respect to the leaf tiles that include the boundaries not yet clipped to form the total drivable surface boundary. In addition, boundary data, such as boundary geometry, boundary type (e.g., curb, wall, grass, sand, dirt, gravel, bollard, etc.), and the like, may be stored in association with the boundary-type tiles (e.g., N222, N224, and N242). After the conversion is complete, the map data 238 may represent a portion 240 of the drivable surface boundary 228, and the map data 238 may be used by various vehicle components, as will be described in more detail below.

With continued reference to FIG. 2B, the map data 235 also illustrates examples of the present disclosure related to hierarchical spatial tiles and/or a spatially indexed data structure, and the map data 235 may be generated (e.g., using at least some of the examples described with respect to the map data 238) to provide a portion 245 of the total drivable surface boundary 228. Although for illustrative purposes, only portions 240 and 245 are shown in a hierarchical format, in some examples, all of map data 228 representing the total drivable surface boundary may be stored in a hierarchical data structure (e.g., and further in a serialized data structure). As explained above, in examples of the present disclosure, at least some tiles may correspond with a portion of the total drivable surface. For example, tiles 2232 and 2241 correspond with portions that are entirely within the boundary of the total drivable surface (as pictorial depicted using a darkest stipple density identifying nodes entirely within the total drivable surface). In addition, other tiles (e.g., all of 242, 243, 244, 2211, and 2222) may correspond with a portion that is entirely outside of the total drivable surface (e.g., all of the portion corresponds with a non-drivable surface). In addition, some tiles, such as the tile 2141 and the tile 2142 correspond with a portion that includes or overlaps with the boundary between the drivable surface and the non-drivable surface (with boundary nodes identified lightest stipple in the map data 235). As indicated above, in some instances, the nodes including at least a portion of a drivable surface boundary may be described as, or further divided into leaf tiles or other lower-level tiles, as opposed to tiles that do not include any portion of the drivable surface boundary (e.g., tiles entirely within the drivable surface boundary or entirely within a non-drivable surface).

In at least some examples of the present disclosure, the tiles (e.g., data associated with the tiles) may be serialized and stored in a contiguous memory space. For example, referring to FIG. 2C, the map data 235 is reproduced, in addition to an example memory-space ordering 246. In some examples, the map data 235 is serialized for deployment on a vehicle, and after being loaded on the vehicle, is deserialized as an in-memory data structure for use by the vehicle (e.g., by systems of the vehicle). In accordance with examples, the memory may store data associated with the tiles. For example, tiles that do not include a drivable surface boundary (e.g., tiles classified as either drivable or non-drivable) may be represented in the spatial index by tile identifiers that indicate whether the tile is associated with a non-drivable surface or a drivable surface. For example, tile 24 in FIG. 2C may store an identifier "0" representing the tile 244 that indicates tile 244 is associated with a non-drivable surface. Similar identifiers may be indexed for other tiles associated with a non-drivable surface (e.g., for tiles 242, 243, 2412, 2413, and 2414). In another example, tile 214 may store an identifier "1" representing the tile 2144 that indicates tile 2144 is associated with a drivable surface. In addition, memory associated with any of the boundary tiles (e.g., 2142) may store drivable-surface boundary geometries (e.g., the geometry of the boundary as it passes through the tile) and the type of surface boundary. For example, arrow 248 shows where data associated with the tile 2134 is located in the memory space, and in the memory space, information that is specific to the tile 2134 may be stored, such as the geometry of the boundary passing through the tile 2134 and the boundary type. In addition, the memory may store links between the tile 2134 and adjacent nodes, including adjacent nodes falling under different parent nodes. For example, a link may be stored between the tile 2134 and the tile 2312 (even though those nodes are under different parent nodes), and in some instances, these links may be useful when searching or querying the memory space. In examples, linking data may be provided to multiple adjacent tiles. For example, linking data may be provide for a child tile, as well as an ancestor/parent tile. FIG. 2C illustrates other examples, including the in-memory data associated with tile 2411 storing data associated with the boundary geometry, boundary type, a link to the data associated with tile 2233, which is organized under a different parent tile than 2411 in the spatial index. FIG. 2C illustrates an example in which some data associated with a drivable surface tile (e.g., 2144) may include the representative identifier. In some examples, additional data (e.g., not shown) associated with the drivable surface tile may be stored (e.g., at an address), including data that may be useful when determining how to control a vehicle (e.g., the identifier "1," drivable surface elevation, etc.). That is, data stored in association with tiles may be optimized (e.g., to optimize compute/query speed) based on the types of queries supported.

Figure 2D:
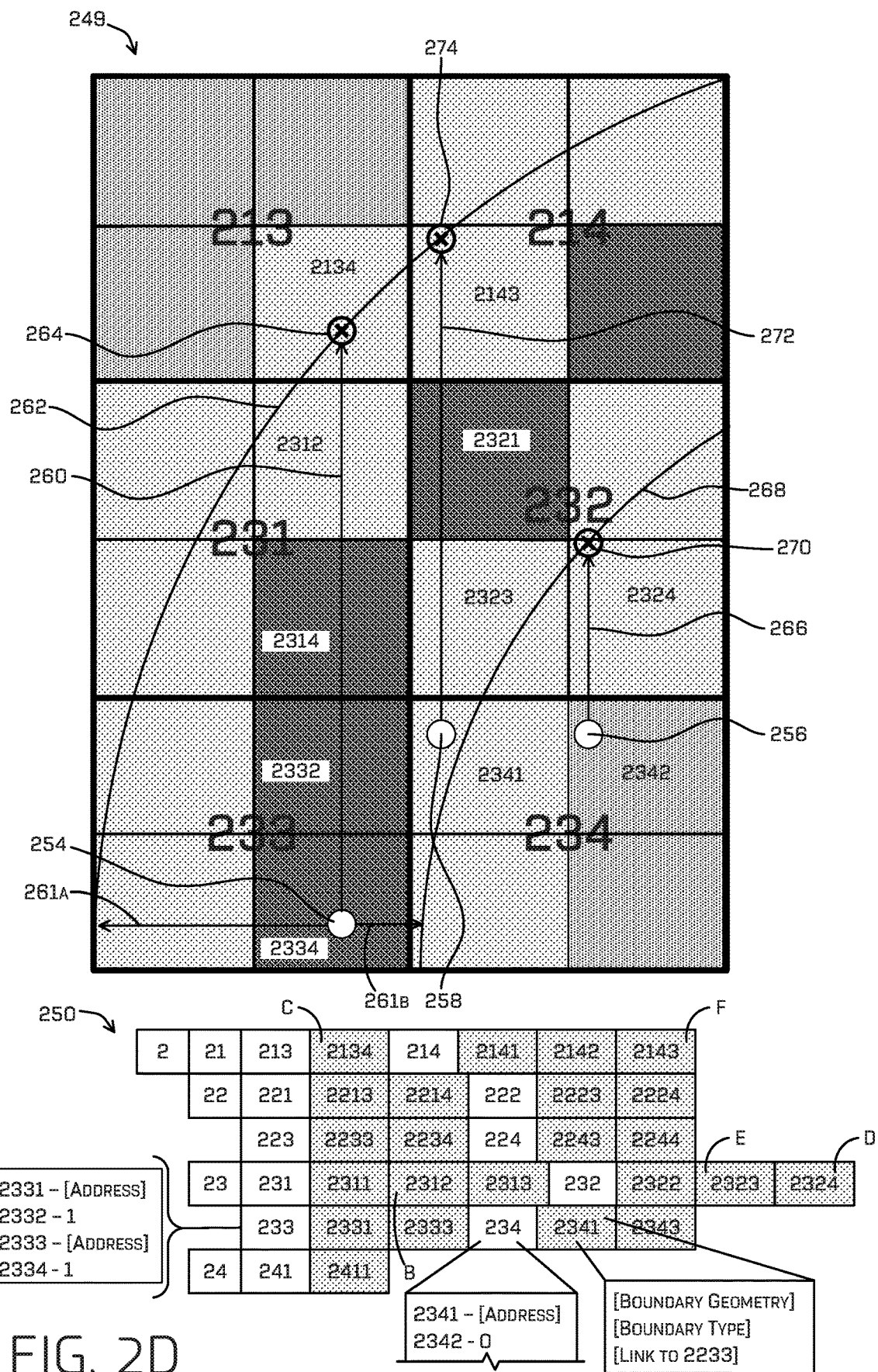

Various types of queries may be supported by the spatially indexed data structure (e.g., serialized map data), such as when the vehicle 102 is traversing through the environment 100. Referring to FIG. 2D, an enlarged portion 249 of the map data 235 is depicted together with a memory structure 250 (same as the memory 246 in FIG. 2B) to help illustrate examples. In some examples, a query may be executed to determine whether a given position (e.g., vehicle pose relative to map data) is associated with a tile that is either within the total drivable surface boundary, completely outside the total drivable surface, or along the total drivable surface boundary. For example, with a given pose 254, the spatially indexed data structure (e.g., memory structure 250) may be searched (e.g., by searching down the quadtree from the top to find the tile containing the query position) to determine that, based on data associated with the tile 2334 (e.g., based on the special tile identifier "1" described above for drivable-type tiles and indexed in the tile 233), the pose 254 is at a position associated with a drivable surface (e.g., a surface that is entirely within the total surface boundary). In another example, with a given pose 256, the data structure may be searched to determine that, based on data associated with the tile 2342 (e.g., based on the special tile identifier "0" described above for non-drivable-type tiles and indexed in the tile 234), the pose 256 is at a position associated with a non-drivable surface (e.g., a surface that is entirely outside of the total surface boundary). In another example, with the given pose 258, the memory may be searched (e.g., down the quadtree) to determine that, based on data associated with the tile 2341 (e.g., "A" in the memory structure 250 depicted in FIG. 2D), the pose 258 is at a position associated with a boundary tile.

Additional queries may be performed on the map data. For instance, in at least some examples, based on a vehicle pose and vehicle orientation (e.g., actual orientation or proposed orientation based on a proposed trajectory), the map data may be searched to determine a location of a boundary. For example, an initial tile may be identified (based on the pose) as described above. From the initial position, a search may be performed using a ray casting technique (e.g., along the direction of a given ray based on the orientation). For example, when the initial tile is determined to be drivable (e.g., completely within the drivable surface boundary), the search may proceed onto the neighboring tile hit by the ray, until the search identifies a boundary tile. That is, the search may iteratively proceed from one neighboring tile to the next (which may be drivable surface tiles) and along the ray direction until a boundary tile is reached. For example, from the initial position 254, a search may proceed in the direction of the ray 260 until a boundary tile 2312 (e.g., "B" in FIG. 2D) is reached. In some examples, the query may quickly and efficiently determine that tiles 2332 and 2314 are drivable (e.g., based on the identifiers) and move to the boundary tile 2312. In the boundary tile 2312, the ray is cast to determine, based on the geometry data of the boundary 262 stored in association with the tile 2312, whether the ray 260 intersects the boundary, and if so, then where. In the example provided in FIG. 2D, the ray 260 does not intersect the boundary 262 in the tile 2312, so the search proceeds to the neighboring node 2134 (e.g., "C" in FIG. 2D). As indicated, in at least some example of this disclosure, a reference or other data may be stored linking the tile 2312 to the neighboring tile 2134, even though these nodes have different parent nodes, which can improve searching efficiencies. In the tile 2134, the ray may be cast again to determine whether the ray 260 intersects the boundary 262, and if so where. As illustrated, the ray 260 does intersect the boundary 262 at point 264, which can be used to determine various information related to the boundary. For example, based on the hit or intersection point, a location of the boundary 262 may be determined. In addition, a distance from the intersection point to the pose may be determined. Furthermore, examples of this disclosure may store boundary-type data (e.g., curb presence, curb dimensions, grass, sand, dirt, gravel, wall, bollard, etc.) in the memory associated with the tile 2134, and the type of boundary associated with the drivable surface may be determined. In some examples, this information (e.g., distance to boundary, boundary type, etc.) related to the boundary may be used by downstream components to determine operations of a vehicle (e.g., trajectory, corridor, etc.). Although the ray casting described with respect to the ray 260 may include a direction parallel to the facing direction of the vehicle, in some examples, ray may be cast in a direction perpendicular or normal to the facing direction of the vehicle. For example, in some instances, a ray 261a and/or a ray 261b may be cast from the location 254 to query the boundary 262 and/or the boundary 268.

With continued reference to FIG. 2D, similar searches may be performed with respect to the position 256 and/or 258 based on a respective orientation of the vehicle at any position. For example, after determining the position 256 is associated with a non-drivable surface (e.g., based on data "0" associated with node 2342), the map data may be searched (e.g., using ray casting) to determine a position at which the drivable surface may be entered based on a given orientation. In one example, the ray (e.g., ray 266) may be cast (based on an orientation) into a neighboring tile until a boundary tile is reached, such as tile 2324. In the boundary tile 2324, the ray casting is performed to determine, based on the geometry data of the boundary 268 stored in association with the tile 2324 (e.g., "D" in the memory structure 251 depicted in FIG. 2D), whether the ray 266 intersects the boundary 268, and if so, then where. As illustrated, the ray 266 does intersect the boundary 268 at point 270, which can be used to determine various information associated with the boundary, such as the location and type of the boundary, as well as an entry point for the vehicle back onto the drivable surface. In some instances, this information may be used by downstream components to determine operations of a vehicle (e.g., trajectory, corridor, etc.).

In another example related to searching the position 258, after determining the position 258 is associated with a boundary tile (e.g., based on data associated with tile 2341), the map data may be searched (e.g., using ray casting based on vehicle orientation) to determine a location of a drivable surface boundary. In some instances, when the initial node is determined to be a boundary tile, the ray is cast (based on the orientation) to determine whether the ray intersects the boundary (based on the boundary geometry stored in association with the tile 2341). In the example of FIG. 2D, a ray 272 does not intersect the boundary 268 in the tile 2341, so the search may proceed to the neighboring tile 2323 (e.g., "E" in the memory structure 251 depicted in FIG. 2D) in a similar manner, and the ray cast search may iteratively proceed. Again, based on linking data, the search may efficiently proceed from the tile 2341 to the tile 2323 without having to traverse up through the hierarchical structure. Casting the ray 272 in the tile 2323 may determine the ray 272 does not intersect the boundary 268, such that the search proceeds to the neighboring tile 2321. The tile 2321 is a drivable surface tile, and, as indicated above, the memory may include an identifier (e.g., "1") associated with the tile 2321 to indicate the search may proceed to the next neighboring tile 2143 (e.g., without needing to determine whether the ray intersects a boundary). As indicated, based on linking data, the search may efficiently proceed from the tile 2321 to the tile 2143 (e.g., "F" in the memory structure in FIG. 2D) even though the tiles are organized under different parent nodes within the hierarchical format (e.g., without needing to search up through the structure and back down to the tile 2144). In the tile 2144, the search may continue by determining (based on boundary geometry stored in association with the tile 2144) whether the cast ray 272 intersects with the boundary 262, and if so where. As illustrated, the ray 272 does intersect the boundary 262 at point 274, which can be used to determine boundary information (e.g., location and type of the boundary) for use by downstream components to determine operations of a vehicle (e.g., trajectory, corridor, etc.).

In at least some examples, the spatially indexed data structure representing the total drivable surface boundary 228 may be provided to the vehicle 102 (e.g., as an in-memory representation of the drivable surface) to be referenced when navigating the environment 100. In addition, an application programming interface may be provided to facilitate drivable-surface boundary queries (e.g., as described with respect to FIG. 2D), such as queries from a trajectory planner, remote operator, perception system, and the like. In some examples, a radius from a given location may be determined and locations of boundaries may be searched within the radius. In accordance with examples of the present disclosure, searching the data structure may be more efficient based on the spatial locality of data. That is, with the map data being stored in a continuous memory space, data that is accessed around the given pose (e.g., the position of the vehicle) during ray casting may be relatively limited and spatially close. That is, in examples, children/descendants of a tile are stored before a sibling of the next tile. In addition, leaf tiles stored under a same parent tile may be stored close in the memory space, as well as spatially close. In addition, in examples, representation of different surfaces may be conductive to efficient searching by using identifiers (e.g., "1" and "0") to represent ties that are either entirely within the drivable surface boundary or entirely outside of the drivable surface boundary. The use of identifiers in this manner may allow for efficient, quick, and focused searching to a limited set of information. This, and other described naming conventions, can speedup lookup operations. Furthermore, in examples where a search (e.g., pose location) falls within a boundary tile, the amount of geometric data (or other data) considered in the query may be smaller (e.g., due to the tiling), which can also improve query speed and efficiency.

Figure 3:
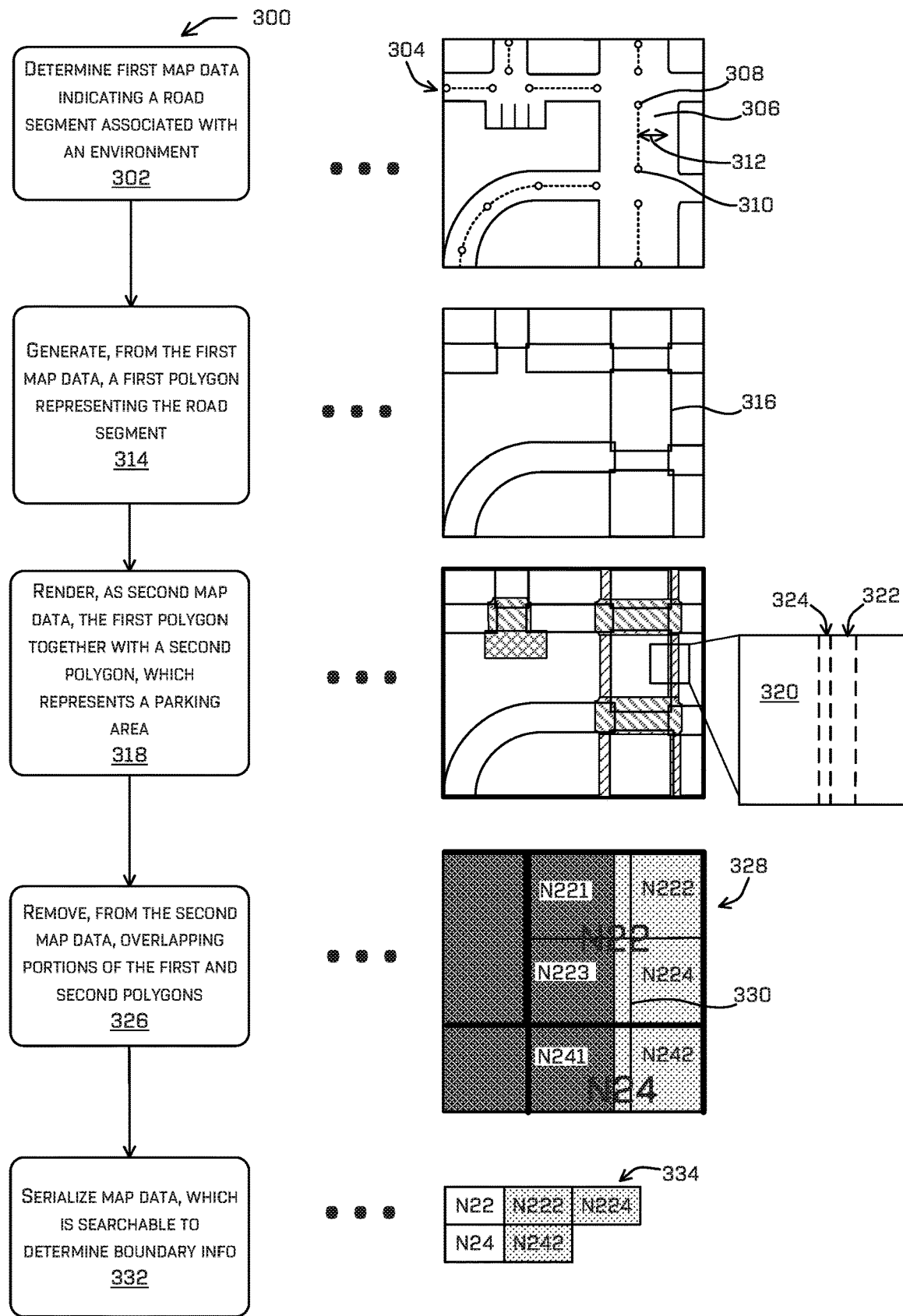
FIG. 3 illustrates an example process for generating map data, in accordance with examples of the present disclosure.

Referring to FIGS. 3 and 4, each figure includes a flowchart showing a process or method in accordance with examples of the present disclosure. The methods illustrated in FIGS. 3 and 4 may be described with reference to one or more of the elements shown in FIGS. 1 and 2A-2D for convenience and ease of understanding. However, the methods illustrated in FIGS. 3 and 4 are not limited to being performed using these elements and may be implemented using any of the other vehicles, computing devices, computing systems, and/or other elements described in this application, as well vehicles, computing devices, computing systems, and/or other elements other than those described herein. Moreover, the elements (e.g., vehicles, computing devices, computing systems, etc.) described herein are not limited to performing the methods illustrated in FIGS. 3 and 4.

FIG. 3 is a flowchart illustrating an example method 300 for generating map data including a total drivable surface boundary, such as the total drivable surface boundary 128 and/or 228. At operation 302, the method 300 includes determining first map data indicating a road segment associated with an environment. For example, first map data 304 may include data associated with a road segment 306, such as control points 308 and 310, lane widths 312, tangent constraints, and the like. As described, road-segments data (e.g., control points) may be generated by cartographers (e.g., human and/or automated) that add the control points to map data to best fit the road curvature (e.g., as a computational representation of the road), given the constraints (e.g., curve tangent) of the control points.

At operation 314, the method includes generating, from the first map data, a first polygon representing the road segment. In at least some examples, a polygon 316 associated with the road segment 306 may be generated by fitting a collection of Piecewise Clothoid Curves (PCC) to the control points 308 and 310, and the clothoid curves may be adaptively sampled, such as by iteratively sub-dividing the curves until they meet a user-defined curve constraint (e.g., user defined smoothness). From the sub-divided curves, outermost lane boundaries may be determined based on the lane widths, which may provide opposing sides of the polygons.

The method 300 may also include, at operation 318, rendering, as second map data, the first polygon together with a second polygon, which represents a map-data annotation indicating a parking area. In some examples, a portion of the first polygon overlaps with a portion of the second polygon. For example, the road-segment polygon 320 may be rendered together with the parking-area polygon 322 (e.g. using a map editing tool), and both polygons 320 and 322 may include overlapping portions (e.g., at 324).

At operation 326, the method includes clipping, from the second map data, the portion of the first polygon and the portion of the second polygon. For example, in the map data 328, the boundaries associated with the overlapping portion 324 have been clipped, and the map data 328 illustrates the unclipped portion 330 (e.g., boundary forming drivable-surface boundary) of the polygon 322. As described, this may be computationally performed based on geometric logical checks and/or Boolean polygon operations that account for polygon type. As explained above, the Boolean operations may consider the type of annotation polygon being processed, including whether the polygon represents a drivable surface, the type of drivable surface, or alternatively, whether the polygon represents a non-drivable surface, such as a median, and should be excluded from the drivable surface. As such, examples of the present disclosure enable creation of one larger, drivable surface polygon, from which smaller, non-drivable surface polygons may be excluded, as opposed to needing to create multiple drivable surface polygons around the non-drivable area. In at least some such examples, removal may be based at least in part on a hierarchy of drivable types. For example, where a polygon of type lane overlaps with a polygon of type sidewalk, the overlapping portion that is indicated as a lane may be removed, while the polygon portion indicated as type sidewalk may be retained. In such examples, such a hierarchy may improve the safe operation of the vehicle by further biasing the vehicle away from certain drivable types (e.g., away from the sidewalk in this example).

The method 300 also includes, at operation 332, converting data associated with the second map data to spatially indexed tiles, wherein data associated with an unclipped portion of the second polygon is stored in a leaf tile of the spatially indexed tiles. For example, data associated with the map data 328 may be stored in memory as spatially indexed tiles 334, including storing information related to the unclipped portion 330 (e.g., the boundary) in a leaf tile (e.g., the leaf tiles N222, N224, and N242).

FIG. 4 includes a flowchart illustrating an example method 400 for searching spatially indexed map data to determine information associated with a total drivable surface, drivable-surface boundary, or non-drivable surface. The method 400 may be executed in various contexts or situations. For example, the method 400 may be executed as part of a trajectory prediction operation, remote operations (e.g., process to remotely control the vehicle), perception operations (e.g., assessing or sensing an environment in which a vehicle is positioned), etc. At operation 402, the method 400 includes determining, in relation to map data representing the environment, a location and an orientation associated with the autonomous vehicle. For example, FIG. 4 illustrates, in association with operation 402, map data 404 with a pose 406 marked by an "x."

At operation 408, the method 400 includes determining, based on the pose (e.g., pose location), a tile included among spatially indexed tiles of the map data. For example, FIG. 4 illustrates, among spatially indexed tiles 410, the tile 2332, which is based on the pose 406. As described with respect to FIGS. 2C and 2D, tiles of the spatially indexed tiles may include a classification of a drivable surface (e.g., represented by the darkest stipple in FIG. 4), drivable-surface boundary (e.g., represented by the lightest stipple in FIG. 4), or non-drivable surface (e.g., represented by the medium stipple in FIG. 4). In addition, tiles of the spatially indexed tiles may represent a plurality of different types of drivable surfaces (e.g., a road-segment drivable surface, parking-area drivable surfaces, driveway drivable surfaces, etc.). For example, when the boundaries 412 and 414 are formed, a plurality of different drivable surfaces may be combined into the polygon formed by the boundaries 412 and 414.

In some examples, information about a tile may be determined by referencing in-memory data, such as the data 416. For example, a search may be conducted down the spatially indexed tiles to determine information associated with the tile 2332. For instance, the search may determine that at memory space "G," data is stored indicating the tile 2332 is associated with a drivable surface (e.g., where memory space "G" stores an identifier "1," as depicted and described in FIG. 2D). In some examples, an operation of the vehicle may be based on the classification of a tile (e.g., whether the pose location is associated with a drivable surface, a drivable-surface boundary, or a non-drivable surface).

The method 400 includes, at operation 418, casting, in a direction based on the pose (e.g., pose orientation), a ray from the tile and across the spatially indexed tiles. For example, FIG. 4 illustrates a ray 420 cast from the first tile 2332 and across the spatially indexed tiles 410. In particular, the ray 420 is cast across the tile 2314, the tile 2312, and the tile 2134. In other examples, a ray may also (or alternatively) be cast in a direction perpendicular or normal to the heading direction of the vehicle.

At operation 422, the method 400 includes determining whether the ray intersects a drivable-surface boundary. For example, as the ray 420 is cast across a tile, the memory 416 may be referenced to determine whether the tile is associated with a drivable surface, a drivable-surface boundary, or a non-drivable surface. In addition, where the tile is associated with the drivable-surface boundary, the memory space associated with the tile may be referenced to determine boundary geometry for determining whether the ray intersects the drivable-surface boundary. For example, when the ray 420 is cast across the tile 2312, memory space "H" may be referenced to determine boundary geometry and determine whether the ray 420, when cast across the tile 2312, intersects the boundary 414. Similarly, when the ray 420 is cast across the tile 2134, memory space "J" may be referenced to determine boundary geometry associated with the tile 2134 and determine whether the ray 420, when cast across the tile 2134, intersects the boundary 414.

In at least some examples, at operation 424, the method 400 includes controlling the vehicle based on whether the ray intersects the drivable surface. For instance, in the example where the ray 420 intersects the boundary 414 at an intersection point, a distance from the pose to the intersection point can be determined and used to determine a trajectory. The trajectory may be used by various vehicle components, such as the planner or perception system. In some examples, the vehicle may determine, from the intersection of the ray with the drivable surface boundary, a location of the drivable surface boundary. As such, controlling the vehicle may include determining a distance between a reference point along a proposed trajectory and the location of the drivable surface boundary, and a cost associated with the proposed trajectory may be determined based on the distance. In some examples, the proposed trajectory may be executed based on the cost, or an alternative proposed trajectory having a lower cost may be selected for execution. Controlling the vehicle, such as by selecting a trajectory based on boundary-related costs, may include any of the techniques described in U.S. Pat. No. 11,110,918, entitled "Dynamic Collision Checking," which is incorporated herein by reference in its entirety for all intents and purposes.

Figure 5:
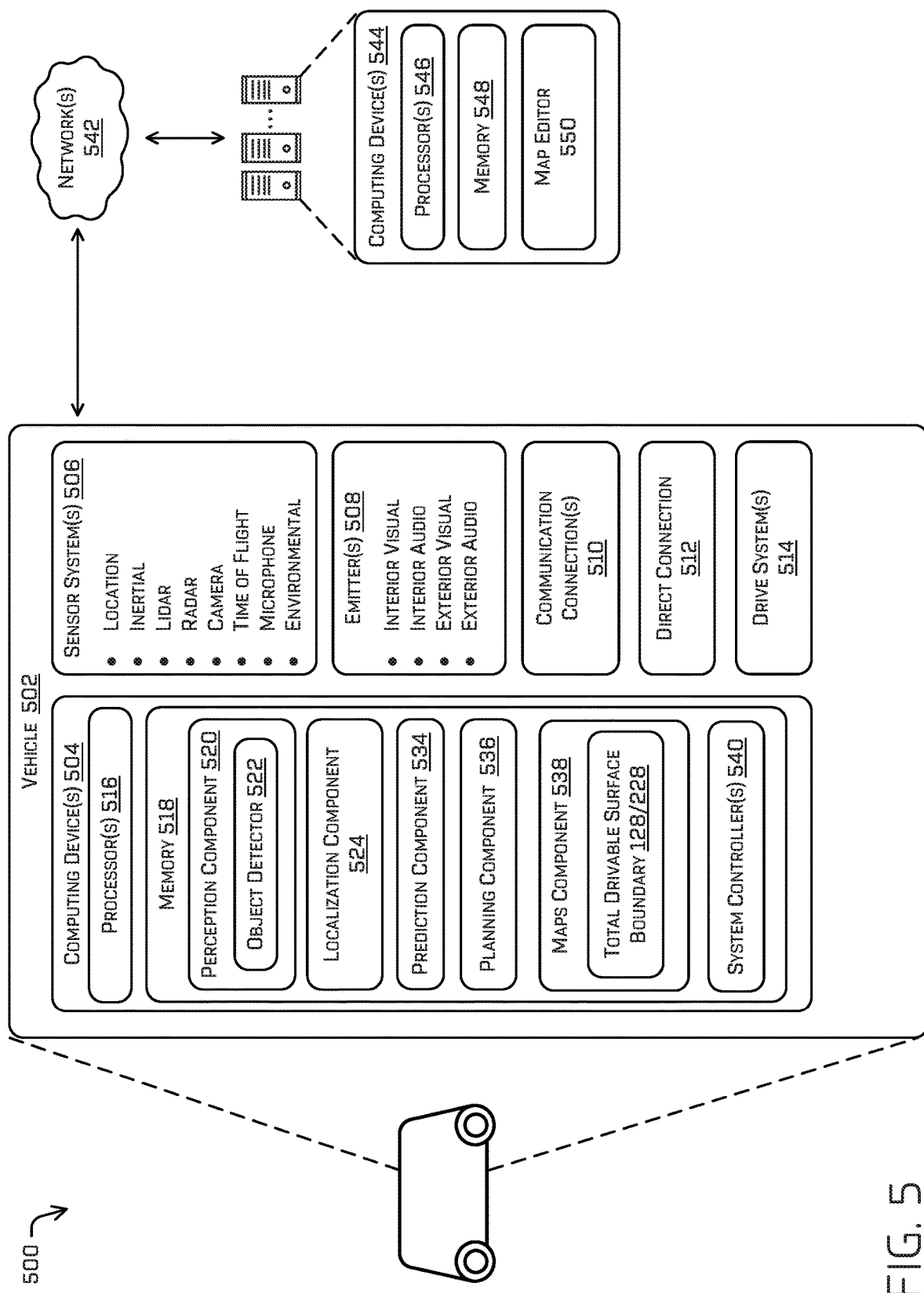
FIG. 5 is a block diagram illustrating an example system for performing techniques as described herein.

FIG. 5 depicts a block diagram of an example system 500 for implementing the techniques described herein. In at least one example, the system 500 can include a vehicle 502. In the illustrated example system 500, the vehicle 502 is an autonomous vehicle; however, the vehicle 502 can be any other type of vehicle. The vehicle 502 may be the vehicle 102 depicted in FIG. 1.

The vehicle 502 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 can be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 502 can include one or more computing device(s) 504, one or more sensor system(s) 506, one or more emitter(s) 508, one or more communication connection(s) 510 (also referred to as communication devices and/or modems), at least one direct connection 512 (e.g., for physically coupling with the vehicle 502 to exchange data and/or to provide power), and one or more drive system(s) 514. The one or more sensor system(s) 506 can be configured to capture sensor data associated with an environment.

The one or more sensor system(s) 506 can include time-of-flight sensors, location sensors (e.g., GPS, compass, etc.), inertial sensors (e.g., sensor including inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, ball joint sensors, chassis position sensors, etc. The one or more sensor system(s) 506 can include multiple instances of any of these or other types of sensors. For instance, the time-of-flight sensors can include individual time-of-flight sensors located at the corners, front, back, sides, and/or top of the vehicle 502. As another example, the camera sensors can include multiple cameras disposed at various locations about the exterior and/or interior of the vehicle 502. The one or more sensor system(s) 506 can provide input to the computing device 504.

The vehicle 502 can also include one or more emitter(s) 508 for emitting light and/or sound. The one or more emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 can also include one or more communication connection(s) 510 that enable communication between the vehicle 502 and one or more other local or remote computing device(s) (e.g., a remote teleoperation computing device) or remote services. For instance, the one or more communication connection(s) 510 can facilitate communication with other local computing device(s) on the vehicle 502 and/or the one or more drive system(s) 514. Also, the one or more communication connection(s) 510 can allow the vehicle 502 to communicate with other nearby computing device(s) (e.g., other nearby vehicles, traffic signals, etc.).

The one or more communications connection(s) 510 can include physical and/or logical interfaces for connecting the computing device 504 to another computing device or one or more external networks 542 (e.g., the Internet). For example, the one or more communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 502 can include one or more drive system(s) 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor system(s) 506 to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) 506 on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) 506 and to control operation of the various vehicle systems. In some examples, the drive system controller can include one or more processor(s) and memory communicatively coupled with the one or more processor(s). The memory can store one or more components to perform various functionalities of the drive system(s) 514. Furthermore, the drive system(s) 514 also include one or more communication connection(s) that enable communication by the respective drive system with one or more other local or remote computing device(s).

The computing device 504 can include one or more processor(s) 516 and memory 518 communicatively coupled with the one or more processor(s) 516. In the illustrated example, the memory 518 of the computing device 504 stores a perception component 520, a localization component 524, a prediction component 534, a planning component 536 (or "planner"), a maps component 538 (e.g., including the total drivable surface boundary 128 and/or 228), and one or more system controller(s) 540. Though depicted as residing in the memory 518 for illustrative purposes, it is contemplated that the perception component 520, the localization component 524, the prediction component 534, the planning component 536, the maps component 538, and the one or more system controller(s) 540 can additionally, or alternatively, be accessible to the computing device 504 (e.g., stored in a different component of vehicle 502) and/or be accessible to the vehicle 502 (e.g., stored remotely).

The perception component 520 can include functionality to perform object detection, segmentation, and/or classification. In some examples, the perception component 520 and/or the object detector 522 can provide processed sensor data that indicates a presence of an entity that is proximate to the vehicle 502 and/or a classification of the entity as an entity type (e.g., car, pedestrian, cyclist, building, tree, road surface, curb, sidewalk, unknown, etc.). In additional and/or alternative examples, the perception component 520 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. In one example, the perception component 520 may detect a ground surface and determine a ride height based on sensor data.

Further, the perception component 520 can include functionality to store perception data generated by the perception component 520. In some instances, the perception component 520 can determine a track corresponding to an object that has been classified as an object type. For purposes of illustration only, the perception component 520, using sensor system(s) 506 can capture one or more images of an environment, which may be used to determine information about an environment.

The stored perception data can, in some examples, include fused perception data captured by the vehicle. Fused perception data can include a fusion or other combination of sensor data from sensor system(s) 506, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

In general, the object detector 522 can detect (among other things) semantic objects represented by sensor data. In some examples, the object detector 522 can identify such semantic objects and can determine a two-dimensional or a three-dimensional bounding box associated with the object. The object detector 522 can determine additional information such as a location, orientation, pose, and/or size (e.g., length, width, height, etc.) associated with the object. The object detector 522 can send data to other components of the system 500 for localization and/or determining calibration information, as discussed herein.

The localization component 524 can include functionality to receive data from the sensor system(s) 506 and/or other components to determine a position of the vehicle 502. In addition, the localization component 524 can include and/or request/receive a three-dimensional map of an environment and can continuously determine a location of the autonomous vehicle within the map. In some instances, the localization component 524 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 524 can provide data to various components of the vehicle 502 to determine an initial position of an autonomous vehicle for generating a trajectory or for initial calibration. In examples of this disclosure, the localization component 524 may determine a position of the vehicle 502, and the position may be used to determine a tile included in spatially indexed tiles associated with the total drivable surface boundary 128/228.

The prediction component 534 can generate one or more probability maps representing prediction probabilities of possible locations of one or more objects in an environment. For example, the prediction component 534 can generate one or more probability maps for vehicles, pedestrians, animals, and the like within a threshold distance from the vehicle 502. In some instances, the prediction component 534 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 536 can determine a path for the vehicle 502 to follow to traverse through an environment. For example, the planning component 536 can determine various routes and paths and various levels of detail. In some instances, the planning component 536 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 536 can generate an instruction for guiding the autonomous vehicle along at least a portion of the route from the first location to the second location. In at least one example, the planning component 536 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle. In some examples, the planning component 536 may determine a path based on boundary data determined from the total drivable surface boundary 128/228 (e.g., boundary location, boundary type, etc.).

In some examples, the planning component 536 can alternatively, or additionally, use data from the perception component 520 and/or the prediction component 534 to determine a path for the vehicle 502 to follow to traverse through an environment. For example, the planning component 536 can receive data from the perception component 520 and/or the prediction component 534 regarding objects associated with an environment. Using this data, the planning component 536 can determine a route to travel from a first location (e.g., a current location) to a second location (e.g., a target location) to avoid objects in an environment. In at least some examples, such a planning component 536 may determine there is no such collision free path and, in turn, provide a path which brings vehicle 502 to a safe stop avoiding all collisions and/or otherwise mitigating damage.

The memory 518 can further include a maps component 538 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some examples, the maps component 538 can include at least some of the map data 104, including the total drivable surface boundary 128 and 228. In some examples, map data can include the spatially indexed tiles (e.g., 235 and 238), as well as in-memory data (e.g., 250). A map can further include an object identifier, an object classification, a three-dimensional location, covariance data (e.g., represented in image data or a multi-resolution voxel space), and the like. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In some examples, the vehicle 502 can be controlled based at least in part on the map(s) component 538. That is, the map(s) component 538 can be used in connection with the perception component 520 (and sub-components), the localization component 524 (and sub-components), the prediction component 534, and/or the planning component 536 to determine a location of the vehicle 502, identify objects in an environment, generate prediction probabilit(ies) associated with objects and/or the vehicle 502, and/or generate routes and/or trajectories to navigate within an environment.

In at least one example, the computing device 504 can include one or more system controller(s) 540, which can be configured to control steering, propulsion, braking, safety, emitters, communication, and other systems of the vehicle 502. These system controller(s) 540 can communicate with and/or control corresponding systems of the drive system(s) 514 and/or other components of the vehicle 502, which may be configured to operate in accordance with a path provided from the planning component 536.

The vehicle 502 can connect to computing device(s) 544 via network 542 and can include one or more processor(s) 546 and memory 548 communicatively coupled with the one or more processor(s) 546. In at least one instance, the one or more processor(s) 546 can be similar to the processor(s) 516 and the memory 548 can be similar to the memory 518. In some examples, the memory 548 may include a maps editor 550 for generating map data including a total drivable surface boundary. For example, the maps editor 550 may execute operations for generating drivable surface polygons (e.g., road-segment polygons) and unioning drivable surface polygons. In some examples, functionality of the maps editor 550 may include clipping out boundaries, such as described with respect to map data 225 and 238.

The processor(s) 516 of the computing device 504 and the processor(s) 546 of the computing device(s) 544 can be any suitable processor capable of executing instructions to process data and perform operations as described herein. By way of example and not limitation, the processor(s) 516 and 546 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 518 computing device 504 and the memory 548 of the computing device(s) 544 are examples of non-transitory computer-readable media. The memory 518 and 548 can store an operating system and one or more software applications, instructions, programs, and/or data to implement the methods described herein and the functions attributed to the various systems. In various implementations, the memory 518 and 548 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 518 and 548 can be implemented as a neural network. In some examples, a machine learned model could be trained to determine total drivable surface boundaries or locations of boundaries relative to vehicle pose.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Example Clauses

A. An autonomous vehicle comprising: one or more processors; and one or more non-transitory computer-readable media storing instructions executable by the one or more processors, wherein the instructions, when executed, cause the autonomous vehicle to perform operations comprising: determining, in relation to map data representing an environment, a location and an orientation associated with the autonomous vehicle, wherein the map data includes spatially indexed tiles representing: a plurality of different types of drivable surfaces associated with the environment, and a drivable-surface boundary separating the plurality of different types of drivable surfaces from a non-drivable surface; determining, among the spatially indexed tiles and based at least in part on the location, a first tile corresponding with a first type of drivable surface associated with the environment; casting, from the first tile and based at least in part on the orientation, a ray across a second tile associated with a second type of drivable surface associated with the environment that is different from the first type of drivable surface; determining, based at least in part on the ray and the drivable-surface boundary, a trajectory; and controlling the autonomous vehicle based at least in part on the trajectory.

B. The autonomous vehicle of claim A, wherein: the first tile and the second tile represent portions adjacent to one another in the environment and are associated with different parent tiles in the spatially indexed tiles; and the operations further comprise determining link data that is associated with the first tile and that provides an address to the second tile.

C. The autonomous vehicle of either claim A or B, wherein: the first tile represents a first portion of the environment and the second tile represents a second portion of the environment; the ray is cast across a third tile that represents a third portion of the environment spatially between the first portion and the second portion; and the operations further comprise: determining that the third tile is associated with an index identifier indicating a drivable surface.

D: The autonomous vehicle of any one of paragraphs A-C, wherein: the first type of drivable surface is a road segment and the second type of drivable surface is one or more of a parking lane, a parking lot, a parking space, a driveway, or a bike lane.

E: The autonomous vehicle of any one of paragraphs A-D, wherein; the operations further comprise determining, based at least in part on data stored in association with the second tile, a boundary type associated with the drivable-surface boundary; the boundary type is a parking-area boundary type, a road-segment boundary type, or a driveway boundary type; and determining the trajectory is further based at least in part on the boundary type.

F: A method comprising: determining, in relation to map data that represents an environment, a location associated with a vehicle, wherein the map data includes spatially indexed tiles representing: a drivable surface comprised of a plurality of different types of drivable surfaces associated with the environment, and a drivable-surface boundary separating the drivable surface from a non-drivable surface; determining, based on the location a tile included among the spatially indexed tiles; determining a classification of the tile including whether the tile is associated with the drivable surface, the drivable-surface boundary, or the non-drivable surface; and controlling, based on the classification, an operation of the vehicle.

G: The method of paragraph F, wherein: the method further comprises: determining an orientation associated with the vehicle; and casting, in a direction based on the orientation, a ray from the tile and across the spatially indexed tiles representing the plurality of different types of drivable surfaces.

H: The method of paragraph G further comprising: determining, based on an intersection between the ray and the drivable-surface boundary, a proposed trajectory of the vehicle.

I: The method of paragraph H further comprising: determining an intersection point between the ray and the drivable-surface boundary; and determining a distance between the intersection point and the location, wherein the proposed trajectory is based on the distance.

J: The method of any one of paragraphs G-I, wherein: the ray is cast across a first tile and a second tile that represent portions adjacent to one another in the environment; the first tile and the second tile are associated with different parent tiles in the spatially indexed tiles; and the method further comprises determining link data that is associated with the first tile and that provides an address to the second tile.

K: The method of any one of paragraphs G-J, wherein: the ray is cast across a first tile representing a first portion of the environment; and the method further comprises: determining an index identifier associated with the first tile and indicating a drivable surface.

L: The method of any one of paragraphs F-K, wherein the plurality of different types of drivable surfaces includes a road-segment drivable surface and one or more of parking lane, a parking lot, a parking space, a driveway, or a bike lane.

M: The method of any one of paragraphs F-L, wherein: the method further comprises determining, based at least in part on data stored in association with the tile, a boundary type including a parking-area boundary type, a road-segment boundary type, or a driveway boundary type; and controlling the operation of the vehicle includes determining a trajectory based at least in on the boundary type.

N: The method of any one of paragraphs F-M, wherein: at least one drivable surface of the plurality of different types of drivable surfaces is represented by a first tile associated with a first level of the spatially indexed tiles; and the drivable-surface boundary is represented by a leaf tile associated with a second level of the spatially indexed tiles, the second level being a sub-level of the first level.

O: One or more non-transitory computer-readable media storing instructions that, when executed, cause one or more processors to perform operations comprising: determining, in relation to map data that represents an environment, a pose associated with a vehicle, wherein the map data includes spatially indexed tiles representing: a plurality of different types of drivable surfaces associated with the environment, and a drivable-surface boundary separating the plurality of different types of drivable surfaces from a non-drivable surface; casting, based on the pose, a ray across the spatially indexed tiles representing the plurality of different types of drivable surfaces; and controlling, based on an intersection of the ray with the drivable-surface boundary, an operation of the vehicle.

P: The one or more non-transitory computer-readable media of paragraph O, wherein: the pose includes a location and an orientation; the operations further comprise determining, based on the location, a tile included among the spatially indexed tiles; and the ray is cast from the tile based on the orientation.

Q: The one or more non-transitory computer-readable media of either paragraph O or P further comprising: determining an intersection point between the ray and the drivable-surface boundary; and determining a distance between the intersection point and the pose, wherein controlling the vehicle includes determining a trajectory based at least in part on the distance.

R: The one or more non-transitory computer-readable media of any one of paragraphs O-Q, wherein: the ray is cast across a first tile and a second tile that represent portions adjacent to one another in the environment; the first tile and the second tile are associated with different parent tiles in the spatially indexed tiles; and the operations further comprise determining link data that is associated the first tile and that provides an address to the second tile.

S: The one or more non-transitory computer-readable media of any one of paragraphs O-R, wherein: the ray is cast across a first tile representing a first portion of the environment; and the operations further comprise: determining an index identifier associated with the first tile and indicating a drivable surface; and casting, based at least in part on the index identifier indicating the drivable surface, the ray across a second tile.

T: The one or more non-transitory computer-readable media of any one of paragraphs O-S, wherein: the plurality of different types of drivable surfaces are represented by first tiles associated with a first level of the spatially indexed tiles; and the drivable-surface boundary is represented by leaf tiles associated with a second level of the spatially indexed tiles, the second level being a sub-level of the first level.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. An autonomous vehicle comprising:
one or more processors; and one or more non-transitory computer-readable media storing instructions executable by the one or more processors, wherein the instructions, when executed, cause the autonomous vehicle to perform operations comprising:

determining, in relation to map data representing an environment, a location and an orientation associated with the autonomous vehicle, wherein the map data includes spatially indexed tiles representing:
- a plurality of different types of drivable surfaces associated with the environment, and
- a drivable-surface boundary separating the plurality of different types of drivable surfaces from a non-drivable surface;

determining, among the spatially indexed tiles and based at least in part on the location, a first tile associated with a first branch of a spatial index and corresponding with a first type of drivable surface associated with the environment;

determining, as the autonomous vehicle is traversing the environment, link data stored in association with the first tile, the link data providing an address to an adjacent tile in the environment such that a search proceeds from the first tile to the adjacent tile without having to proceed through a hierarchical structure associated with the adjacent tile;

determining a second tile adjacent the first tile based at least in part on the link data associating the first tile with the second tile, the second tile being associated with a second branch of the spatial index and with a second type of drivable surface associated with the environment that is different from the first type of drivable surface;

casting, from the first tile and based at least in part on the orientation, a ray across the second tile;

determining, based at least in part on the ray and the drivable-surface boundary, a trajectory; and controlling the autonomous vehicle based at least in part on the trajectory.

2. The autonomous vehicle of claim 1, wherein:
the first tile represents a first portion of the environment and the second tile represents a second portion of the environment;
the ray is cast across a third tile that represents a third portion of the environment between the first portion and the second portion; and
the operations further comprise:
determining that the third tile is associated with an index identifier indicating a drivable surface.

3. The autonomous vehicle of claim 1, wherein:
the first type of drivable surface is a road segment and the second type of drivable surface is one or more of a parking lane, a parking lot, a parking space, a driveway, or a bike lane.

4. The autonomous vehicle of claim 1, wherein:
the operations further comprise determining, based at least in part on data stored in association with the second tile, a boundary type associated with the drivable-surface boundary;
the boundary type is a parking-area boundary type, a road-segment boundary type, or a driveway boundary type; and
determining the trajectory is further based at least in part on the boundary type.

5. A method comprising:
determining, in relation to map data that represents an environment, a location associated with a vehicle, wherein the map data includes spatially indexed tiles representing:
- a drivable surface comprised of a plurality of different types of drivable surfaces associated with the environment, and
- a drivable-surface boundary separating the drivable surface from a non-drivable surface;

determining, among the spatially indexed tiles, a first tile associated with a first branch of the spatially indexed tiles;

determining, as the vehicle is traversing the environment, link data stored in association with the first tile, the link data providing an address to an adjacent tile in the environment such that a search proceeds from the first tile to the adjacent tile without having to proceed through a hierarchical structure associated with the adjacent tile;

determining a second tile adjacent the first tile based at least in part on the link data associating the first tile with the second tile, the second tile being associated with a second branch of the spatially indexed tiles;

determining a classification of the second tile including whether the second tile is associated with the drivable surface, the drivable-surface boundary, or the non-drivable surface; and controlling, based on the classification, an operation of the vehicle.

6. The method of claim 5, wherein:
the method further comprises:
determining an orientation associated with the vehicle; and
casting, in a direction based on the orientation, a ray from the first tile and across the spatially indexed tiles representing the plurality of different types of drivable surfaces.

7. The method of claim 6 further comprising:
determining, based on an intersection between the ray and the drivable-surface boundary, a proposed trajectory of the vehicle.

8. The method of claim 7 further comprising:
determining an intersection point between the ray and the drivable-surface boundary; and
determining a distance between the intersection point and the location, wherein the proposed trajectory is based on the distance.

9. The method of claim 6, wherein:
the ray is cast across the first tile and the second tile that represent portions adjacent to one another in the environment; and
the first tile and the second tile are associated with different parent tiles in the spatially indexed tiles.

10. The method of claim 6, wherein:
the ray is cast across the first tile representing a first portion of the environment; and
the method further comprises:
determining an index identifier associated with the first tile and indicating a drivable surface.

11. The method of claim 5, wherein the plurality of different types of drivable surfaces includes a road-segment drivable surface and one or more of parking lane, a parking lot, a parking space, a driveway, or a bike lane.

12. The method of claim 5, wherein:
the method further comprises determining, based at least in part on data stored in association with the second tile, a boundary type including a parking-area boundary type, a road-segment boundary type, or a driveway boundary type; and controlling the operation of the vehicle includes determining a trajectory based at least in on the boundary type.

13. One or more non-transitory computer-readable media storing instructions that, when executed, cause one or more processors to perform operations comprising:
determining, in relation to map data that represents an environment, a pose associated with a vehicle, wherein the map data includes spatially indexed tiles representing:
a plurality of different types of drivable surfaces associated with the environment, and
a drivable-surface boundary separating the plurality of different types of drivable surfaces from a non-drivable surface;
determining, among the spatially indexed tiles, a first tile associated with a first branch of a spatial index;
determining, as the vehicle is traversing the environment, link data stored in association with the first tile, the link data providing an address to an adjacent tile in the environment such that a search proceeds from the first tile to the adjacent tile without having to proceed through a hierarchical structure associated with the adjacent tile;
determining a second tile adjacent the first tile based at least in part on the link data associating the first tile with the second tile, the second tile being associated with a second branch of the spatial index;
casting, from the first tile and based on the pose, a ray across the second tile; and
controlling, based on an intersection of the ray with the drivable-surface boundary, an operation of the vehicle.

14. The one or more non-transitory computer-readable media of claim 13, wherein:
the pose includes a location and an orientation;
the operations further comprise determining, based on the location, the first tile included among the spatially indexed tiles; and
the ray is cast from the first tile based on the orientation.

15. The one or more non-transitory computer-readable media of claim 13 further comprising:
determining an intersection point between the ray and the drivable-surface boundary; and
determining a distance between the intersection point and the pose, wherein controlling the vehicle includes determining a trajectory based at least in part on the distance.

16. The one or more non-transitory computer-readable media of claim 13, wherein:
the ray is cast across the first tile representing a first portion of the environment; and
the operations further comprise:
determining an index identifier associated with the first tile and indicating a drivable surface; and
casting, based at least in part on the index identifier indicating the drivable surface, the ray across the second tile.

17. The one or more non-transitory computer-readable media of claim 13, wherein:
the plurality of different types of drivable surfaces are represented by first tiles associated with a first level of the spatially indexed tiles; and
the drivable-surface boundary is represented by leaf tiles associated with a second level of the spatially indexed tiles, the second level being a sub-level of the first level.

18. The autonomous vehicle of claim 1, wherein the first tile is associated with an identifier indicating the first tile represents a portion of the environment that is entirely within a drivable surface boundary.

19. The autonomous vehicle of claim 1, wherein:
the first tile comprises a first sub-tile, a second sub-tile, a third sub-tile, and a fourth sub-tile,
the link data is associated with the first sub-tile of the first tile, and
the determining the second tile adjacent the first tile is based at least in part on the link data associating the first sub-tile with the second tile.

20. The autonomous vehicle of claim 1, wherein the first tile is associated with a first parent node and comprises a first sub-tile; and
the operations further comprise:
determining a second sub-tile adjacent the first sub-tile based at least in part on the link data associating the first sub-tile with the second sub-tile, the second sub-tile being associated with the second tile associated with a second parent node of the spatial index.

* * * * *